United States Patent [19]

Harpell et al.

[11] Patent Number: 4,748,064

[45] Date of Patent: * May 31, 1988

[54] BALLISTIC-RESISTANT COMPOSITE ARTICLE

[75] Inventors: Gary A. Harpell, Morristown; Igor Palley, Madison; Sheldon Kavesh, Whippany; Dusan C. Prevorsek, Morristown, all of N.J.

[73] Assignee: Allied Corporation, Morris Township, Morris County, N.J.

[*] Notice: The portion of the term of this patent subsequent to Nov. 18, 2003 has been disclaimed.

[21] Appl. No.: 825,039

[22] Filed: Dec. 9, 1985

Related U.S. Application Data

[63] Continuation-in-part of Ser. No. 691,048, Jan. 14, 1985, Pat. No. 4,623,574.

[51] Int. Cl.$^4$ ................................................ B32B 5/12
[52] U.S. Cl. ..................... 428/113; 428/114; 428/229; 428/232; 428/245; 428/255; 428/260; 428/263; 428/284; 428/294; 428/295; 428/902
[58] Field of Search ............... 428/911, 105, 113, 114, 428/260, 263, 265, 284, 294, 295, 289, 290, 245, 902, 255, 297, 229, 232; 2/25

[56] References Cited

U.S. PATENT DOCUMENTS

| | | | |
|---|---|---|---|
| 4,403,012 | 9/1983 | Harpell et al. | 428/290 |
| 4,422,998 | 1/1984 | Hawkinson | 428/911 |
| 4,457,985 | 4/1984 | Harpell et al. | 428/224 |
| 4,623,574 | 11/1986 | Harpell et al. | 428/911 |

OTHER PUBLICATIONS

R. C. Laible, F. Figucia "The Application of High-Modulus Fibers to Ballistic Protection", *J. Macromol. Sci. Chem.*, a7(1), pp. 295–322, (1973).

A. L. Alesi et al., "New Materials and Construction for Improved Helmets", NTIS Publication, AD-AO18 958.

A. L. Lastnik et al., "The Effect of Resin Concentration and Laminating Pressures on Kevlar Fabric Bonded with a Modified Phenolic Resin, *Technical Report*, NATICK/TR-84/030, Jun. 8, 1984.

*Primary Examiner*—James J. Bell
*Attorney, Agent, or Firm*—Richard A. Negin; Gerhard Fuchs

[57] ABSTRACT

The present invention provides an improved, composite article of manufacture which comprises a network of fibers having a tensile modulus of at least about 500 grams/denier and an energy-to-break of at least about 22 Joules/gram. An elastomeric matrix material having a tensile modulus of less than about 6,000 psi, measured at 25° C.

30 Claims, 1 Drawing Sheet

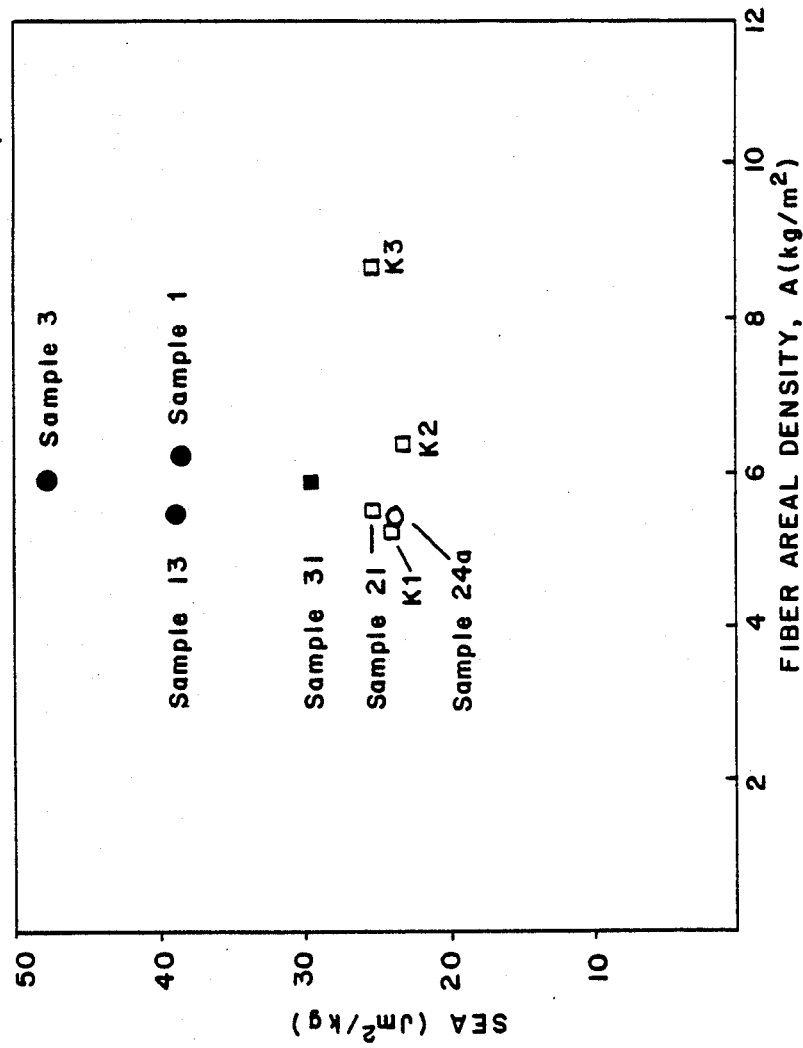

BALLISTIC-RESISTANT COMPOSITE ARTICLE

This application is a continuation-in-part of Ser. No. 691,048, filed Jan. 14, 1985, now U.S. Pat. No. 4,623,574.

BACKGROUND OF THE INVENTION

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, glass fibers and the like. For many applications, such as vests or parts of vests, the fibers are used in a woven or knitted fabric. For many of the other applications, the fibers are encapsulated or embedded in a composite material.

In "The Application of High Modulus Fibers to Ballistic Protection" R. C. Laible et al., J. Macromol. Sci.—Chem. A7(1), pp. 295–322 1973, it is indicated on p. 298 that a fourth requirement is that the textile material have a high degree of heat resistance; for example, a polyamide material with a melting point of 255° C. appears to possess better impact properties ballistically than does a polyolefin fiber with equivalent tensile properties but a lower melting point. In an NTIS publication, AD-A018 958 "New Materials in Construction for Improved Helmets", A. L. Alesi et al., a multilayer highly orrented polypropylene film material (without matrix), referred to as "XP", was evaluated against an aramid fiber (with a phenolic/polyvinyl butyral resin matrix). The aramid system was judged to have the most promising combination of superior performance and a minimum of problems for combat helmet development.

U.S. Pat. No. 4,403,012 and U.S. Pat. No. 4,457,985 disclose ballistic-resistant composite articles comprised of networks of high molecular weight polyethylene or polypropylene fibers, and matrices composed of olefin polymers and copolymers, unsaturated polyester resins, epoxy resins, and other resins curable below the melting point of the A. L. Lastnik, et al.; "The Effect of Resin Concentration and Laminating Pressures on KEVLAR ® Fabric Bonded with Modified Phenolic Resin", Technical Report NATICK/TR-84/030, June 8, 1984; disclose that an interstitial resin, which encapsulates and bonds the fibers of a fabric, reduces the ballistic resistance of the resultant composite article.

BRIEF DESCRIPTION OF THE INVENTION

The present invention provides an improved, ballistic-resistant composite article of manufacture which comprises a network of high strength fibers having a tensile modulus of at least about 500 grams/denier and an energy-to-break of at least about 22 Joules/gram in an elastomeric matrix material which substantially coats each of the individual fibers and has a tensile modulus of less than about 6,000 psi, measured at 25° C.

Compared to conventional ballistic-resistant armor structures, the composite article of the present invention can advantageously provide a selected level of ballistic protection while employing a reduced weight of protective material. Alternatively, the article of the present invention can provide increased ballistic protection when the article has a weight equal to the weight of a conventionally constructed piece of composite armor.

BRIEF DESCRIPTION OF THE DRAWINGS

The invention will be more fully understood and further advantages will become apparent when reference is made to the following detailed description of the invention and the accompanying drawings in which:

FIG. 1 is a graph which representatively shows certain ballistic resistance characteristics of ECPE fiber-containing composites and KEVLAR-containing fiber composites.

DETAILED DESCRIPTION OF THE INVENTION

For the purposes of the present invention, a fiber is an elongate body the length dimension of which is much greater than the transverse dimensions of width and thickness. Accordingly, the term fiber includes simple filament, ribbon, strip, and the like having regular or irregular cross-section.

Composite articles of the present invention include a fiber network, which may include an ultra-high molecular weight polyethylene fiber, an ultra-high molecular weight polypropylene fiber, an aramid fiber, an ultra-high molecular weight polyvinyl alcohol fiber, an ultra-high molecular weight polyacrylonitrile fiber or mixtures thereof. The network of fibers can be comprised of similar fibers having different compositions.

U.S. Pat. No. 4,457,985 generally discusses such high molecular weight polyethylene and polypropylene fibers, and the disclosure of this patent is hereby incorporated by reference to the extent that it is not inconsistent herewith.

In the case of polyethylene, suitable fibers are those of molecular weight of at least 500,000, preferably at least one million and more preferably between two million and five million. Such extended chain polyethylene (ECPE) fibers may be grown in solution as described in U.S. Pat. No. 4,137,394 to Meihuzen et al., or U.S. Pat. No. 4,356,138 of Kavesh et al., issued Oct. 26, 1982, or a fiber spun from a solution to form a gel structure, as described in German Off. No. 3,004,699 and GB No. 2051667, and especially as described in application Serial No. 572,607 of Kavesh et al. filed January 20, 1984 (see EPA No. 64,167, published Nov. 10, 1982). Depending upon the formation technique, the draw ratio and temperatures, and other conditions, a variety of properties can be imparted to these fibers. The tenacity of the fibers should be at least 15 grams/denier, preferably at least 20 grams/denier, more preferably at least 25 grams/denier and most preferably at least 30 grams/denier. Similarly, the tensile modulus of the fibers, as measured by an Instron tensile testing machine, is at least 300 grams/denier, preferably at least 500 grams/denier and more preferably at least 1,000 grams/denier and most preferably at least 1,500 grams/denier. These highest values for tensile modulus and tenacity are generally obtainable only by employing solution grown or gel fiber processes. Many of the fibers have melting points higher than the melting point of the polymer from which they were formed. Thus, for example, ultra-high molecular weight polyethylenes of 500,000, one million and two million generally have melting points in the bulk of 138° C. The highly oriented polyethylene fibers made of these materials have melting points 7°–13° C. higher. Thus, a slight increase in melting point reflects the crystalline perfection of the fibers. Nevertheless, the melting points of these fibers remain substantially below nylon; and the efficacy of these fibers for ballistic resistant articles is contrary to the various teachings cited above which indicate temperature resistance as a critical factor in selecting ballistic materials.

Similarly, highly oriented polypropylene fibers of molecular weight at least 750,000, preferably at least one million and more preferably at least two million may be used. Such ultra high molecular weight polypropylene may be formed into reasonably well oriented fibers by the techniques prescribed in the various references referred to above, and especially by the technique of U.S. Ser. No. 572,607, filed Jan. 20, 1984, of Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The melting point of the polypropylene is generally raised several degrees by the orientation process, such that the polypropylene fiber preferably has a main melting point of at least 168° C., more preferably at least 170° C. The particularly preferred ranges for the above-described parameters can adventageously provide improved performance in the final article.

High molecular weight polyvinyl alcohol fibers having high tensile modulus are described in U.S. Pat. No. 4,440,711 to Y. Kwon, et al., which is hereby incorporated by reference to the extent it is not inconsistent herewith.

In the case of polyvinyl alcohol (PV—OH), PV—OH fiber of molecular weight of at least about 500,000, preferably at least about 750,000, more preferably between about 1,000,000 and about 4,000,000, and most preferably between about 1,500,000 and about 2,500,000 may be employed in the present invention. Particularly useful PV—OH fiber should have a modulus of at least about 300 g/denier, a tenacity of at least about 7 g/denier (preferably at least about 10 g/denier, more preferably at about 14 g/denier, and most preferably at least about 17 g/denier), and an energy to break of at least about 22 joules/g. PV—OH fibers having a weight average molecular weight of at least about 500,000, a tenacity of at least about 300 g/denier, a modulus of at least about 10 g/denier, and an energy to break of about 22 joules/g are more useful in producing a ballistic resistant article. PV—OH fiber having such properties can be produced, for example, by the process disclosed in U.S. patent application Ser. No. 569,818, filed Jan. 11, 1984, to Kwon et al., and commonly assigned.

In the case of polyacrylonitrile (PAN), PAN fiber of molecular weight of at least about 400,000, and preferably at least 1,000,000 may be employed. Particularly useful PAN fiber should have a tenacity of at least about 10 g/denier and an energy to break of at least about 22 joule/g. PAN fiber having a molecular weight of at least about 400,000, a tenacity of at least about 15-20 g/denier and an energy to break of at least about 22 joule/g is most useful in producing ballistic resistant articles; and such fibers are disclosed, for example, in U.S. Pat. No. 4,535,027.

In composite articles containing such fibers, the fibers are arranged in a network which can have various configurations. For example, a plurality of fibers can be grouped together to form a twisted or untwisted yarn. The fibers or yarn may be formed as a felt, knitted or woven (plain, basket, satin and crow feet weaves, etc.) into a network, or formed into a network by any of a variety of conventional techniques. For example, the fibers may also be formed into nonwoven cloth layers by conventional techniques.

The fibers or networks may be molded by subjecting them to heat and pressure. Temperatures for molding ECPE fibers or networks may range from about 20°-145° C., preferably range from about 100°-135° C., and more preferably range from about 110°-130° C. Good ballistics resistance is found for articles molded at up to 145° C. Articles molded at room temperature can also provide good ballistics resistance.

The fibers may be coated with a variety of polymeric and non-polymeric materials, but are preferably coated with a low modulus, elastomeric material comprising an elastomer. The elastomeric material has a tensile modulus, measured at about 23° C., of less than about 6,000 psi (41,300 kPa). Preferably, the tensile modulus of the elastomeric material is less than about 5,000 psi (34,500 kPa), more preferably, is less than 1,000 psi (6900 kPa) and most preferably is less than about 500 psi (3,450 kPa) to provide even more improved performance. The glass transition temperature (Tg) of the elastomer of the elastomeric material (as evidenced by a sudden drop in the ductility and elasticity of the material) is less than about 0° C. Preferably, the Tg of the elastomer is less than about −40° C., and more preferably is less than about −50° C. The elastomer also has an elongation to break of at least about 50%. Preferably, the elongation to break is at least about 100%, and more preferably, it is about 300% for improved performance.

Coated fibers may be arranged (in the same fashion as uncoated fibers) into woven, non-woven or knitted fabrics. Furthermore, the fibers, used either alone or with coatings, may be wound or connected in a conventional fashion.

The proportion of coating on the fiber may vary from relatively small amounts (e.g. 1% by weight of fibers) to relatively large amounts (e.g. 150% by weight of fibers), depending upon whether the coating material has any ballistic-resistant properties of its own (which is generally not the case) and upon the rigidity, shape, heat resistance, wear resistance, flammability resistance and other properties desired for the composite article. In general, ballistic-resistant articles of the present invention containing coated fibers should have a relatively minor proportion of coating (e.g. 10–30%, by weight of fibers), since the ballistic-resistant properties are almost entirely attributable to the fiber. Nevertheless, coated fibers with higher coating contents may be employed. Generally, however, when the coating content exceeds about 60% (by weight of fiber), the coated fibers are consolidated to form a composite without the use of additional matrix material.

The coating may be applied to the fiber in a variety of ways. One method is to apply the neat resin of the coating material to the fibers either as a liquid, a sticky solid or particles in suspension or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, aromatic solvents or hydrocarbon solvents, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor (gel fiber) before the high temperature stretching operation, either before or after removal of the solvent from the fiber. The fiber may then be stretched at elevated temperatures to produce the coated fibers. The gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

If the fiber achieves its final properties only after a stretching operation or other manipulative process, e.g. solvent exchanging, drying or the like, it is contemplated that the coating may be applied to the precursor material. In this embodiment, the desired and preferred tenacity, modulus and other properties of the fiber should be judged by continuing the manipulative process on the fiber precursor in a manner corresponding to that employed on the coated fiber precursor. Thus, for example, if the coating is applied to the xerogel fiber described in U.S. application Ser. No. 572,607 and the coated xerogel fiber is then stretched under defined temperature and stretch ratio conditions, then the fiber tenacity and fiber modulus values would be measured on uncoated xerogel fiber which is similarly stretched.

It has been discovered that coated strip or ribbon (fiber with an aspect ratio, ratio of fiber width to thickness, of at least about 5) can be even more effective than other forms (cross-sectional shapes) of fibers coated when producing ballistic resistant composites. In particular embodiments of the invention, the aspect ratio of the strip is at least 50, preferably is at least 100 and more preferably is at least 150 for improved performance. Surprisingly, even though an ECPE strip material had significantly lower tensile properties than the ECPE yarn material of the same denier but a generally circular cross section, the ballistic resistance of the composite constructed from ECPE strip was much higher than the ballistic resistance of the composite constructed from the ECPE yarn.

Simple composites may be prepared using a variety of matrix materials. The term, simple composite, is intended to mean combinations of fiber with a single major matrix material, whether or not there are other materials such as fillers, lubricants or the like. When employing fibers coated with low modulus elastomeric material, suitable matrix materials include polyethylene, cross-linked polyethylene, polypropylene, ethylene copolymers, propylene copolymers and other olefin polymers and copolymers. Examples of such other matrix materials include unsaturated polyesters, phenolics, polybutyrals, epoxy resins and polyurethane resins and other low modulus resins curable below the melting point of the fiber.

It has been surprisingly discovered that a low modulus elastomeric matrix material comprising an elastomer, which is similar to the elastomeric material employed to substantially coat each of the individual fibers of the fiber network, can provide a composite having significantly increased ballistic resistance. The resultant composite is comprised of a fiber network and a low modulus elastomeric matrix which substantially coats or encapsulates each of the individual fibers and functions as a matrix. The elastomeric matrix material has a tensile modulus, measured at about 23° C., of less than about 6,000 psi (41,300 kPa). Preferably, the tensile modulus of the elastomeric matrix is less than about 5,000 psi (34,500 kPa), more preferably, is less than 1,000 psi (6900 kPa) and most preferably is less than about 500 psi (3,450 kPa) to provide even more improved performance. The glass transition temperature (Tg) of the elastomer of the elastomeric matrix material (as evidenced by a sudden drop in the ductility and elasticity of the material) is less than about 0° C. Preferably, the Tg of the elastomer is less than about −40° C, and more preferably is less than about −50° C. The elastomer also has an elongation to break of at least about 50%. Preferably, the elongation to break is at least about 100%, and more preferably, it is about 300% for improved performance.

A wide variety of elastomeric materials and formulations may be utilized in this invention. The essential requirement is that the matrix materials of this invention have the appropriately low moduli. Representative examples of suitable elastomers of the elastomeric material matrix have their structures, properties, formulations together with crosslinking procedures summarized in the Encyclopedia of Polymer Science, Volume 5 in the section Elastomers-Synthetic (John Wiley & Sons Inc., 1964). For example, any of the following elastomers may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthate or other plasticers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene.

Particularly useful elastomers are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A—B—A, multiblock copolymers of the type $(AB)_n$(n=2-10) or radial configuration copolymers of the type R—$(BA)_x$(x=3-150); wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Most preferably, the elastomeric matrix material consists essentially of at least one of the above-mentioned elastomers. The low modulus elastomeric matrices may also include fillers such as carbon black, silica, etc. and may be extended with oils and vulcanized by sulfur, peroxide, metal oxide, or radiation cure systems using methods well known to rubber technologists. Blends of different elastomeric materials may be used together or one or more elastomer materials may be blended with one or more thermoplastics. High density, low density, and linear low density polethylene may be cross-linked to obtain a matrix material of appropriate properties, either alone or as blends. In every instance, the modulus of the elastomeric matrix material should not exceed about 6,000 psi (41,300 kPa), preferably is less than about 5,000 psi (34,500 kPa), more preferably is less than 1000 psi (6900 kPa) and most preferably is less than 500 psi (3450 kPa).

The proportions of matrix to fiber is not critical for the simple composites, with matrix amounts of 5 to 150%, by weight of fibers, representing a broad general range. Within this range, it is preferred to form composites having a relatively high fiber content, such as composites having only 10–50% matrix, by weight of fibers. One suitable technique of forming such high fiber composites is to coat the fibers with the matrix material and then to press together a plurality of such coated fibers until the coating materials fuse into a matrix, which may be continuous or discontinuous.

A particularly effective technique for preparing a preferred, simple composite prepreg comprised of substantially parallel, unidirectionally aligned fibers includes the steps of pulling a high modulus fiber through a bath containing a solution of the elastomeric material, and helically winding this fiber into a single sheet-like layer around and along the length of a suitable form, such as a cylinder. The solvent is then evaporated leaving a prepreg sheet of fiber embedded in a matrix that can be removed from the cylindrical form. Alternatively, a plurality of fibers can be simultaneously pulled through the bath of elastomer solution and laid down in closely positioned, substantially parallel relation to one another on a suitable surface. Evaporation of the solvent leaves a prepreg sheet comprised of elastomer coated fibers which are substantially parallel and aligned along a common fiber direction. The sheet is suitable for subsequent processing such as laminating to another sheet.

Coated yarn produced by pulling a group of fibers through the solution of elastomeric matrix material to substantially coat each of the individual fiber, and then evaporating the solvent to form the coated yarn. The yarn can similarly be processed to form fabrics, which in turn, can be used to form desired composite structures.

The coated fiber or yarn can also be processed into a simple composite by employing conventional filament winding techniques followed, for example, a molding step to join multiple layers of the simple composite.

Simple composite materials may be constructed and arranged in a variety of forms. It is convenient to characterize the geometries of such composites by the geometries of the fibers and then to indicate that the matrix material may occupy part or all of the void space left by the network of fibers. One such suitable arrangement is a plurality of layers or laminates in which the coated fibers are arranged in a sheet-like array and aligned parallel to one another along a common fiber direction. Successive layers of such coated, unidirectional fibers can be rotated with respect to the previous layer. An example of such laminate structures are composites with the second, third, fourth and fifth layers rotated $+45°$, $-45°$, $90°$ and $0°$, with respect to the first layer, but not necessarily in that order. Other examples include composites with alternating layers rotated $90°$ with respect to each other.

As noted above, composites containing elastomeric material coated fibers in non-elastomeric matrices are within the scope of the invention. However, preferred composites have the above-described elastomeric material coated fibers in a thermoplastic elastomer matrix, an elastomeric or cross-linked elastomeric matrix, or a low modulus thermoset matrix.

One technique described above for forming coated fiber composites includes the steps of arranging the coated fibers into a desired network structure, and then consolidating and heat setting the overall structure to cause the coating to flow and occupy the remaining void spaces in the network, thereby forming a matrix. Another contemplated technique is to arrange layers or other structures of coated fiber adjacent to and between various forms, e.g. films, of the matrix material and then to consolidate and heat set the overall structure. Also, in the above cases, it is possible that the matrix can be caused to stick or flow without completely melting. In general, however, if the matrix material is caused to melt, relatively little pressure is required to form the composite; while if the matrix material is only heated to a sticking point, generally more pressure is required. Notwithstanding the above, the pressure and time to set the composite and to achieve optimal properties will generally depend on the nature of the matrix material (chemical composition as well as molecular weight) and processing temperature.

In various forms of the present composites, the fiber network occupies different proportions of the total volume of the composite. Preferably, however, the fiber network comprises at least about 50 volume percent of the composite, more preferably between about 70 volume percent, and most preferably at least about 75 volume percent, with the matrix (and coating when coated fibers are employed) occupying the remaining volume.

Most screening studies of ballistic composites employ a 22 caliber, non-deforming steel fragment of specified weight, hardness and dimensions (Mil-Spec. MIL-P-46593A(ORD)). The protective power of a structure is normally expressed by citing the impacting velocity at which 50% of the projectiles are stopped, and is designated the $V_{50}$ value.

Usually, a composite armor has the geometrical shape of a shell or plate. The specific weight of composites such as shells and plates can be expressed in terms of the areal density. This areal density corresponds to the weight per unit area of the composite structure. In the case of fiber reinforced composites, the ballistic resistance of which depends mostly on the fiber, another useful weight characteristic is the fiber areal density of composites. The fiber areal density corresponds to the weight of the fiber reinforcement per unit area of the composite.

To compare structures having different $V_{50}$ values and different areal densities, the following examples state the ratios of (a) the kinetic energy (Joules) of the projectile at the $V_{50}$ velocity, to (b) the areal density of the fiber or of the composite $(kg/m^2)$. These ratios are designated as the Specific Energy Absorption (SEA) and Specific Energy Absorption of Composite (SEAC), respectively.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE 1

A ballistic target (Sample 1) was prepared by consolidation of a plurality of sheets comprised of unidirectional, high strength, extended chain polyethylene (ECPE) yarn impregnated with a thermoplastic elastomer matrix. To produce Sample 1, Yarn 1 was processed in accordance with Precursor Preparation Method 1 and Molding Procedure 1.

Yarn 1: This yarn had a yarn tenacity of approximately 29.5 g/denier, a modulus of approximately 1250 g/denier, an energy-to-break of approximately 55 Joules/g, a yarn denier of approximately 1200 and an individual filament denier of approximately 10 (118 filament, untwisted yarn).

Precursor Preparation Method 1: Thermoplastic elastomer impregnated sheets were prepared in the following manner:

Yarn 1 was pulled simultaneously from two spools and the two yarn strands passed around a smooth guide immersed in a beaker that contained a solution of thermoplastic elastomer in a volatile solvent. The coated yarns were helically wrapped in a closely positioned, side-by-side arrangement around a one foot diameter rotating drum while the immersed roller and beaker were traversed along the length of the drum. After traversing the length of the drum the two strands of yarn were cut and the drum was rotated until the solvent had evaporated. The drum was stopped and the prepreg was cut along the length of the drum and then peeled off to yield a sheet having fiber areal density of 0.148 kg./m$^2$ and weight % fiber of 72.7%. The resultant thin prepreg sheet was comprised of a plurality of substantially parallel strands of coated yarn aligned along a common direction.

The thermoplastic elastomer employed was Kraton D1107, a commercial product of the Shell Chemical Company. This elastomer is a triblock copolymer of the polystyrene-polyisoprene-polystyrene having about 14 weight % styrene. The coating solution was comprised of about 70 g of rubber (elastomer) per liter of dichloromethane solvent.

Molding Procedure 1: In this molding procedure the prepreg was cut into a plurality of square sheets having sides 30.5 cm (one ft.) in length. These squares were stacked together with the fiber length direction in each prepreg sheet perpendicular to the fiber length in adjacent sheets. A thin square of aluminum foil was placed over the top and under the bottom of the stacked prepreg sheets. Two Apollo plates (0.05 cm thick chrome coated steel plates) coated with a general purpose mold release were used to sandwich the sample after a thermocouple probe was inserted approximately 2 cm from the corner of the sample between the two middle prepreg sheet layers. This cold assembly was placed between two platens of a hydraulic press and subjected to a temperature of approximately 130° C. and a pressure of approximately 552 kPa (80 psi). Five minutes after the thermocouple indicated a temperature of 120° C., water coolant was passed through the platen. Pressure was released when the sample temperature was less than 50° C.

EXAMPLES 2 AND 3

Sample 2 was prepared using Precursor Preparation Method 1, from ECPE fiber having modulus of 950 g/denier, tenacity of 25.9 g/denier and energy to break of 58.5 J/g. The molding procedure was identical to Molding Procedure 1 (Ex. 1) except that the Sample was a square having sides 15.2 cm in length.

Sample 3 was prepared in a manner identical to Sample 2 except that the ECPE fiber had modulus of 1650 g/denier, tenacity of 36.9 g/denier and energy-to-break of 60.0 g/denier.

EXAMPLE 4

A plain weave fabric, prepared from non-twisted Yarn 1, had 11 ends/cm(28 ends/inch) in both the warp and fill directions. The fabric was cut into 19 squares having 16.5 cm. sides. These squares were each dipped in a solution of thermoplastic elastomer (120 g of Kraton D1107 per liter dichloromethane) and dried. After the solvent had evaporated, the fabric pieces were redipped.

Molding Procedure 1A: To produce Sample 4, the fabric squares were molded in accordance with Molding Procedure 1, except that a polyethylene film 0.00254 cm thick was substituted for the aluminum foil.

EXAMPLE 5

Yarn 1 was passed through a solution of Kraton D1107 in dichloromethane (20 g/liter) and dried by passing through a tube 90 cm in length heated to 60° C. (residence time 46 seconds) to produce a yarn having 12 wt. % rubber coating. This yarn was used to prepare a plain weave fabric having 11 ends/cm in both the warp and fill directions. The fabric was substantially identical in structure to the fabric of Example 4. Fabric pieces (22) were dipped into a Kraton D1107 solution (90 g of Kraton D1107/liter dichloromethane) and molded in accordance with Molding Procedure 1A (Ex. 4) to produce Sample 5.

EXAMPLE 6

A non-crimped fabric was comprised of 2 layers of Yarn 1. Each yarn layer was comprised of a sheet-like array of unidirectional, parallel yarns and had 11 ends/cm. The two layers of yarn were mated together in face-to-face relation with the yarn direcion of the first yarn layer oriented perpendicular to the yarn direction of the second yarn layer. The two layers of yarn were stitched together by a low denier polyethylene terapthalate yarn which constituted about 6% of the total fabric weight. Twenty layers of this fabric were individually dipped into a solution of Kraton D1107 in dichloromethane (120 g/liter). After drying, the fabric layers were molded according to Molding Procedure 1A (Ex. 4) to produce Sample 6.

EXAMPLE 7

Yarn 1 was coated with Kraton D1107 in the same manner as described in Example 5 to provide a yarn having 11 wt % of elastomer coating. The yarn was twisted to produce 2.2 turns per inch. Prepregs were prepared from this rubber impregnated, twisted yarn by employing Precursor Preparation Method 1, in which the yarns were passed through a thermoplastic elastomer solution composed of about 110 g Kraton D1107 per liter dichloromethane. Layers of prepreg were molded together using Molding Procedure 1A (Ex. 4) to produce Sample 7.

EXAMPLE 8

Yarn 1 was first twisted to produce a twisted yarn having 3 turns per inch, and prepregs were subsequently prepared in accordance with Precursor Preparation Method using Kraton D1107 elastomer dissolved in dichloromethane (110 g/L). Molding was carried out using Molding Procedure 1B, which was similar to Molding Procedure 1, except that six inch square prepregs were molded and low density polyethylene film (0.0025 cm thick) was substituted for the aluminum foil.

EXAMPLE 9

Prepregs were prepared according to Precursor Preparation Method 1 using a different thermoplastic elastomer and solvent (100 g of Kraton G1650 per liter of toluene). Kraton G1650 is a triblock thermoplastic elastomer which is produced commercially by Shell Chemical Co. This elastomer has the structure polystrenepolyethylenebutylene-polystyrene and has 29 wt % styrene.

Molding Procedure 2: In this procedure, prepregs were assembled according to Molding Procedure 1B (Ex. 8) but were molded using a six inch (15.2 cm) square mold having a thermocouple inserted into the middle of one face. Sample 9 was molded by placing the mold between two platens of a hydraulic press at 135° C. at 7.57 MPa (1100 psi). After the mold temperature reached 125° C., heating was continued for 10 minutes before platens were cooled with circulating water.

EXAMPLE 10

Sample 10 was prepared in a manner identical to that employed to prepare Sample 9 except that the thermoplastic elastomer solution used to prepare the prepreg was composed of 60 g Kraton G1650/liter of toluene.

EXAMPLES 11 AND 12

A six inch (15.2 cm) square ballistic target (Sample 11) was prepared using Precursor Preparation 1A except that coating solution was 130 g Kraton D1107/liter dichloromethane, and molded according to Mold Procedure 1B (Ex. 8).

Sample 12 was prepared in a manner identical to that employed to prepare Sample 11, except that coating solution was 30 g Kraton D1107/liter dichloromethane.

EXAMPLE 13

Prepregs were prepared according to Precursor Preparation 1 except that the coating solution was 30 g of polyisoprene elastomer (Natsyn 2200, a product of Goodyear Tire and Rubber Company) per liter of dichloromethane. These prepregs (126 g fiber in 23.3 g elastomer matrix) were coated with 0.5 g of benzoyl peroxide dissolved in 100 ml of hexane. After the hexane had evaporated, a six inch (15.2 cm) square sample (Sample 13) was molded according to Molding Procedure 1B (Ex. 8), except that the sample was molded at a mold temperature of 120° C. for 10 minutes and a mold pressure of 1.53 MPa (222 psi).

EXAMPLE 14

A six inch square ballistic target (Sample 14) was prepared according to Precursor Preparation Method 1, except that the coating solution consisted of a low density polyethylene solution in toluene (67 g/L) held at 80° C. Molding was carried out according to Molding Procedure 2 (Ex. 9).

EXAMPLE 15

A six inch square ballistic target (Sample 15) was prepared according to Precursor Preparation Method 1, except that the coating solution was composed of 53 g of polycaprolactone (PCL-700, a commercial product of Union Carbide Company) per liter of dichloromethane. The molding procedure, was identical to Molding Procedure 2 (Ex. 9) except that the mold pressure was held at 3.5 MPa (500 psi) until mold temperature reached 125° C. at which time the pressure was doubled. After 5 minutes at this higher pressure, the sample was cooled in the normal manner.

EXAMPLE 16

Sample 16 was prepared in a manner identical to that of Example 15, except that the precursor coating solution had a higher polymer concentration (120 g polycaprolactone/liter dichloromethane).

EXAMPLE 17

A six inch (15.2 cm) square ballistic target (Sample 17) was prepared according to Precurcor Preparation Method 1, except that the coating solution was a standard epoxy resin system dissolved in dichloromethane (400 g Epon 828 and 24.3 ml of curing agent diethylaminopropylamine per liter of dichloromethane) and that a release paper was used to cover the rotating drum. Molding was carried out within two hours of the commencement of prepreg preparation. The sample was molded in accordance with Molding Procedure 1B, (Ex. 8), except that the mold temperature was 110° C. for 90 minutes and the mold pressure was 765 kPa (110 psi).

EXAMPLE 18

Prepregs were prepared according to Precursor Preparation Method 1 and molded according to Molding Procedure 1B (Ex. 8) to produce Sample 18.

EXAMPLES 19 AND 20

Samples 19 and 20 were prepared according to Precursor Preparation 1 and molded according to Molding Procedure 2 (Ex. 9).

EXAMPLE 21

A 30.5 cm (1 ft) square plaque was molded from prepregs supplied by Gentex Corporation and represented the state-of-the-art military, ballistic resistant helmet prepregs. These prepregs were comprised of a 2×2 basket weave Kevlar 29 fabric woven from 1500 denier yarn. The fabric had 35 ends/inch (14 ends/cm) in both the warp and fill directions, and the prepreg had approximately 18 wt % of polyvinylbutyral modified phenolic resin. The plaque was molded at 145° C. for 15 minutes at 2.9 MPa (416 psi).

EXAMPLE 22

Kevlar fiber, drum-wound prepregs were prepared according to Precursor Preparation Method 1 and molded using Molding Procedure 1B (Ex. 8). A 1000 denier Kevlar 29 yarn was used to prepare Sample 22.

EXAMPLE 23

Sample 23 was prepared in a manner similar to that of Example 4. A plain weave fabric identical to that described in Example 4 was employed to prepare a ballistic target square having sides 17.8 cm in length.

EXAMPLE 24

A plain weave ECPE ribbon fabric having ribbon width of 0.64 cm, modulus of 865 g/denier and energy-to-break of approximately 45.8 J/g was soaked in a solution 0 of Kraton D1107 (10g/liter of dichloromethane) for 24 hours, dried and dipped in a more concentrated solution (60 g Kraton D1107/liter dichloromethane). The target (Sample 24) was molded according to Molding Procedure 1B (Ex. 8).

EXAMPLE 24A

Fabric layers, 16.5 cm square, were impregnated with an epoxy resin (400 g Epon 828 per 24.3 ml of diethylaminopropylamine curing agent). Sample 24A was prepared employing Molding Procedure 1B (Ex. 8), except that the molding pressure was 325 kPa, the molding temperature was 110° C. and the molding time was 90 min.

EXAMPLE 25

To evaluate the effect of fiber properties, test samples were prepared from drum-wound filament prepregs to produce structures having straight, non-crimped filaments well distributed in a low modulus thermoplastic elastomer matrix. Table 1 representatively shows the results of ballistic testing of three plaques, all having approximately 73 wt % fiber in a polystyrene-polyisoprene-polysytrene thermoplastic elastomer matrix, but having different fiber stress-strain properties. The test results indicated that the ballistic performance improves with improvement in fiber properties (higher modulus, tenacity and energy to break). The performance of each sample exceeded the performance of state-of-the-art composites.

$V_{50}$ values were obtained for composite targets described in Examples 1, 2 and 3 (designated Samples 1, 2 and 3, respectively). Ballistic testing was carried out on the one foot square Sample 1 and all other samples of this size, according to Military Standard 662C. Ballistic testing was carried out on Samples 2 and 3, and all other samples less than one foot square, by placing the target in front of a 1 cm thick plywood board having a 3.8 cm square cut from it. A 22 caliber fragment was fired at center of this 3.8 cm square and the target was repositioned before each shot so that an undamaged portion of the target was tested. Sufficient shots were fired into these targets in order to establish a V50 value.

TABLE 1

Effect of Fiber Properties on Ballistic Performance of ECPE Composites*

| Sample No. | ECPE FIBER | | | |
|---|---|---|---|---|
| | Tenacity (g/den) | Modulus (g/den) | Energy to Break (J/g) | Wt % Fiber |
| 1 | 29.5 | 1257 | 55.0 | 72.7 |
| 2 | 25.9 | 950 | 58.5 | 73.4 |
| 3 | 36.9 | 1650 | 60.0 | 72.0 |

| Sample No. | Target Size | AD g/m² | $V_{50}$ (ft/sec) | SEA (Jm²/kg) |
|---|---|---|---|---|
| 1 | 12" | 6.20 | 2151 | 38.2 |
| 2 | 6" | 6.12 | 2043 | 34.9 |
| 3 | 6" | 5.96 | 2376 | 48.5 |

*Composites molded from filament wound prepregs using polystyrene polyisoprene-polystyrene block copolymer (Kraton D-1107) matrix.

EXAMPLE 26

A number of targets samples were all prepared from the same ECPE yarn (Yarn 1) utilizing Kraton D1107 elastomer at approximately the same matrix concentration. The results, shown in Table 2, indicate that composites incorporating straight, uniformly aligned and dispersed fibers provided the best ballistic resistance (Sample 1). Sample composites comprised of fabric had good ballistic resistance if the yarns were pre-impregnated prior to weaving (Compare Samples 4 and 5). Twisting the preimpregnated yarns reduced the ballistic resistance of the composites constructed with those yarns. Compare Samples 1 and 7. Twisting the yarns prior to the prepreg preparation inhibited the complete coating and impregnation of the yarns, and further reduced the ballistic resistance. Compare Samples 7 and 8. Composites constructed from preimpreganted, drum-wound, unidirectional filaments had greater ballistic resistance than composites constructed from preimpregnated filaments woven into fabric layers. Compare Samples 1 and 5.

TABLE 2

Effect of Reinforcement Construction and Preparation Technique on Ballistic Performance of ECPE Composites with Kraton D-1107 Matrix*

| Sample No. | ECPE Reinforcement Construction | Matrix Content (Wt %) | Fiber Areal Density (Kg/m²) |
|---|---|---|---|
| 1 | Filament Wound prepreg | 27 | 6.20 |
| 4 | Plain weave fabric | 23 | 5.97 |
| 5 | Plain weave fabric same as Sample 4 except ECPE yarn coated with Kraton D-1107 prior to weaving | 22 | 6.22 |
| 6 | No-crimp fabric | 23 | 5.76 |
| 7 | Filament wound prepreg, yarn preimpregnated (12% rubber) and then twisted (2.2 twists/in) | 23 | 5.98 |
| 8 | Filament wound prepreg from twisted yarn (3 twists/in) | 23 | 6.01 |

| Sample No. | Composite Areal Density (Kg/m²) | $V_{50}$ (ft/sec) | SEA (Jm²/Kg) | SEAC (Jm²/Kg) |
|---|---|---|---|---|
| 1 | 8.49 | 2151 | 38.2 | 27.8 |
| 4 | 7.73 | 1779 | 27.1 | 20.9 |
| 5 | 7.97 | 2006 | 33.1 | 25.8 |
| 6 | 7.45 | 1738 | 26.9 | 20.75 |
| 7 | 7.77 | 1927 | 31.8 | 24.5 |
| 8 | 7.81 | 1622 | 22.4 | 17.2 |

EXAMPLE 27

The effect of matrix rigidity on the ballistic performance of ECPE composites was studied at fiber areal density of approximately 6 kg./m² and matrix content of approximately 25%. Data shown in Tables 3 and 4 illustrate that the low modulus matrices give superior ballistic performance.

For composites based on drum wound prepregs (Table 3), the most ballistically resistant composites utilized low modulus elastomer materials. The least ballistically resistant composite utilized a high modulus epoxy matrix material.

TABLE 3

Effect of Matrix Rigidity on
Ballistic Performance of ECPE Composites*
(Drum-wound filament)

| Sample No. | Matrix | Matrix Content (%) | Initial Matrix Modulus (psi) | Fiber Areal Density (Kg/m²) |
|---|---|---|---|---|
| 13 | Cross-linked polyisoprene | 15.6 | 100 | 5.43 |
| 1 | Kraton D1107 | 26.8 | 200 | 6.2 |
| 9 | Kraton G1650 | 28.5 | 2,000 | 6.0 |
| 14 | Low Density Polyethylene | 28.4 | 27,000 | 6.0 |
| 15 | Caprolactone PCL T-700 | 25.0 | 50,000 | 6.0 |
| 17 | Epoxy EPON 828 | 25.5 | 500,000 | 6.0 |

| Sample No. | Composite Areal Density (Kg/m²) | $V_{50}$ (ft/sec) | SEA (Jm²/Kg) | SEAC (Jm²/Kg) |
|---|---|---|---|---|
| 13 | 6.43 | 2020 | 38.5 | 32.5 |
| 1 | 8.49 | 2151 | 38.2 | 28.8 |
| 9 | 8.44 | 2129 | 38.7 | 27.7 |
| 14 | 8.38 | 1887 | 30.4 | 21.7 |
| 15 | 8.00 | 1931 | 32.0 | 23.7 |
| 17 | 8.11 | 1871 | 29.9 | 21.1 |

ECPE Yarn: 28-30 g/den Tenacity, 1200-1400 g/den Modulus
SEA - Specific energy absorption based on fiber areal density
SEAC - Specific energy absorption based on composite areal density For fabric reinforced composites (Table 4) the highest specific energy (SEA=33.1 (Jm²/kg), was obtained from a composite utilizing Kraton D1107 elastomer matrix. It is important that the reinforcing fabric was prepared from yarn pre-impregnated with the Kraton elastomer. Composites utilizing high modulus epoxy matrix gave much inferior ballistic results (SEA=23.5 Jm²/kg).

TABLE 4

Effect of Matrix Rigidity on
Ballistic Performance Of ECPE Reinforced Composites
(Plain Weave Fabric)

| Sample No. | Matrix | Initial Matrix Modulus (psi) | Fiber Areal Density (Kg/m²) |
|---|---|---|---|
| 5 | Kraton D1107 | 200 | 5.97 |
| 24A | Epoxy | 500,000 | 5.90 |

| Sample No. | Composite Areal Density (Kg/m²) | $V_{50}$ ft/sec | SEA Jm²/Kg | SEAC Jm²/Kg |
|---|---|---|---|---|
| 5 | 7.77 | 2006 | 33.1 | 25.8 |
| 24A | 7.96 | 1649 | 23.5 | 17.4 |

Again, it should be noted that the drum-wound filament composite was superior to the fabric reinforced composite.

EXAMPLE 28

Two experiments have shown remarkable stability of h ballistic performance of the composites over large range of the environmental temperatures, from −90° C. to +90° C. Both experiments employed Kraton D1107 resin for the matrix and 22 caliber fragments for testing.

In the first experiment, a 12"×12" composite plate with the areal density of 2.84 kg/m² was tested at 4 different temperatures: 90° C., 22° C., −40° C. and −89° C. Projectile impact velocity was about 1950 ft/sec and the results are shown in Table 5. The values of SEA were in the range of 27-29 Jm²/kg with some tendency to increase toward low temperature values. Energy loss was calculated from the impact and exit velocities of the projectiles.

TABLE 5

Effect of Temperature on Ballistic Performance
of ECPE/Thermoplastic Elastomer Composite by
Energy Loss Measurements

| Sample No. | Composite Temperature (°C.) | SEA Jm²/kg | SEAC Jm²/kg |
|---|---|---|---|
| 18 | 90 | 24.5 | 17.3 |
| 18 | 22 | 26.8 | 19.0 |
| 18 | −40 | 29.1 | 20.6 |
| 18 | −89 | 28.9 | 20.5 |

Composite is molded, drum-wound filament prepreg in Kraton D1107 elastomer.
Impact velocity is approximately 1950 ft/sec.
Areal density of fiber=2.84 kg/m².
Areal density of composite=4.02 kg/m².

In the second experiment, two identical composite plaques (Samples 19 and 20) with fiber areal density of 6.0 kg/m² and resin content of 23% were tested in the terminal test, and $V_{50}$ was determined. One of the plaques was tested at −90° C. and another at room temperature as a control. In both cases, $V_{50}$ was 2100 ft/sec and SEA 38.5 Jm²/kg. The high performance of the composite with elastomeric matrices at temperatures below the matrix Tg (for Kraton D1107; Tg=−55° C.), where the dynamic modulus (DMA data) goes up from approximately 300 psi at room temperature to approximately 100,000 psi is at first sight surprising. However, one should remember, that fiber mechanical properties on which ballistic performance heavily depend, such as fiber modulus, can increase as the temperature decreases.

EXAMPLE 29

Since the matrix represents a weaker phase of the composite, and since the ballistic efficiency of the composites is, eventually, evaluated on the basis of SEAC (Specific Energy Absorption Composites), an excess of matrix is not desirable. However, a certain minimal level of matrix is necessary for good consolidation and performance.

The effect of matrix content is representively shown in Table 6 for elastomers (Kratons) and Caprolactone. The sample with 10 wt % of Kraton 1107 showed lack of consolidation during the ballistic test, and although the projectiles did not penetrate at the tested velocities, the experiment was impossible to complete. A high molding pressure (1100 psi) was employed to prepare a composite containing 13 wt % of Kraton G1650 matrix which had good ballistic performance.

Comparison between two other Kraton D1107 samples with matrix contents 27 and 48 wt %, and Caprolactone composites with matrix content 25 and 49 wt % show that matrix increase in excess of 30% is not desirable. It is remarkable that in these cases the values of SEA (Specific Energy Absorption based on fiber content) were better for the low matrix content composites.

TABLE 6

Effect of Matrix Content on Ballistic Performance
(ECPE Yarn: 28-30 g/den Tenacity,
1200-1400 g/den Modulus,
Drum Wound Filament Prepreg)

| Sample No. | Matrix Type | Matrix Content wt % | Fiber Areal Density Kg/m² | Composite Areal Density Kg/m² | $V_{50}$ ft/sec | SEA Jm²/Kg | SEAC Jm²/Kg |
|---|---|---|---|---|---|---|---|
| 4 | Kraton D1107 | 27.0 | 6.2 | 8.36 | 2151 | 38.2 | 28.8 |
| 11 | Kraton D1107 | 48.0 | 6.0 | 10.96 | 2052 | 35.9 | 19.2 |
| 12 | Kraton D1107 | 10.0 | 5.9 | 6.55 | >1824* | >28.9* | >26.0* |
| 9 | Kraton G1650 | 28.5 | 6.0 | 8.33 | 2129 | 38.7 | 27.7 |
| 10 | Kraton G1650 | 13.4 | 5.95 | 6.87 | 1875 | 30.3 | 26.2 |
| 15 | Caprolactone T-700 | 25.0 | 6.0 | 11.75 | 1931 | 32.0 | 24.0 |
| 16 | Caprolactone T-700 | 49.0 | 6.0 | 8.02 | 1726 | 25.3 | 12.9 |

*Lack of consolidation. Fragment did not penetrate at velocity 1824 ft/sec. $V_{50}$ was not established because of the sample damage.

EXAMPLE 30

Coated ribbon reinforced composites of this invention can be dramatically more effective than composites based on yarn.

Ballistic data for Sample 23 comprised of ECPE yarn in a Kraton D1107 matrix and Sample 24 comprised of ECPE ribbon in a Kraton D1107 matrix are given in Table 7; a comparison of yarn and ribbon properties is given in Table 8. In spite of the fact that the ribbon tensile properties were inferior to those of the yarn, the ribbon composite surprisingly, was ballistically superior to the yarn composite.

TABLE 7

Ballistic Performance of Ribbon and Yarn Composites

|  | Ribbon Sample 24 | Yarn Sample 23 |
|---|---|---|
| Fiber Areal Density (kg/m²) | 2.00 | 1.99 |
| Composite Areal Density (kg/m²) | 2.90 | 3.16 |
| $V_{50}$ (ft/sec) | 1164 | 1126 |
| SEA (Jm²/kg) | 34.7 | 32.6 |
| SEAC (Jm²/kg) | 23.9 | 20.5 |

TABLE 8

Comparison of Yarn and Ribbon Properties

|  | Ribbon Properties | Yarn Properties |
|---|---|---|
| Denier | 1240 | 1200 |
| Tenacity (g/den) | 23.9 | 30 |
| Modulus (g/den) | 865 | 1300 |
| Elongation to break (%) | 3.8 | 4.0 |
| Energy-to-break (J/g) | 45.8 | 60.0 |

EXAMPLE 31

The elastomer coating techniques of the present invention have been employed to increase the ballistic performance of a Kevlar ®29 composite over the state-of-the-art, Kevlar composites. A composite prepared from Kevlar ®29, drum-wound prepregs in an elastomeric Kraton D1107 matrix (Sample 22) had SEA=29.2 Jm²/kg, compared to SEA=26 Jm²/kg for the conventional Kevlar composite having the same areal density set forth as Sample No. 21.

The value of SEA=29.2 Jm²/kg for the Kevlar 29 composite can also be compared to SEA=48 Jm²/kg for the ECPE composite produced by the same technique; the comparison illustrates the superiority of the ECPE fiber over the Kevlar fiber.

FIG. 1 representatively shows the SEA and fiber areal density of some ECPE and Kevlar based composites which are within the scope of the invention. For comparison, this figure also shows some representative state-of-the-art composites which are based on these fibers and prepared by conventional techniques. ECPE fiber composites in Kraton D1107 (Samples 1,3) and polyisoprene (Sample 13) elastomeric matrices, along with Kevlar 29 in a Kraton D1107 matrix (Sample 31) are the structures within the scope of the present invention.

Kevlar 29 fiber composites in a polyvinylbutyral modified phenolic resin (Samples 21,K1,K2,K3) and the ECPE fiber composite in an epoxy matrix (Sample 24a) were prepared by conventional techniques and represent the state-of-the-art.

The composites of the present invention have significantly greater ballistic resistance than the state-of-the-art composites. For example, at the fiber areal density about 6 kg/m², the SEA for ECPE in Kraton D1107 is 38.2 Jm²/kg and the SEA for ECPE in polyisoprene is 38.5 Jm²/kg, as compared with an SEA of 23.5 JM²/kg for the same ECPE fiber in the epoxy matrix. With Kevlar 29 in Kraton D1107, the SEA is 29.2 Jm²/kg, as compared with 23-26 Jm²/kg for the same Kevlar fiber in a polyvinylbutyral modified phenolic resin, as obtained by a state-of-the-art technique.

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. A composite article of manufacture comprising a network of fibers having a tensile modulus of at least about 500 g/denier and an energy-to-break of at least about 22 J/g in a matrix of an elastomeric material which has a tensile modulus (measured at 25° C.) of less than about 6,000 psi (41,300 kPa).

2. An article as recited in claim 1, wherein said fibers are polyethylene fibers having a tensile modulus of at least about 1000 g/denier and an energy-to-break of at least 50 J/g.

3. An article as recited in claim 2 wherein said fiber have a tensile modulus of at least about 1300 g/denier and an energy-to-break of at least about 55 J/g.

4. An article as recited in claim 1 wherein said network of fibers comprises a sheet-like fiber array in which said fibers are arranged substantially parallel to one another along a common fiber direction.

5. An article as recited in claim 1, wherein said network of fibers comprises a non-woven fabric.

6. An article as recited in claim 1, wherein said network of fibers comprises a woven fabric.

7. A composite article as recited in claim 1, wherein the volume fraction of said fibers is at least about 0.5.

8. A composite article as recited in claim 1, wherein the volume fraction of said fibers is at least about 0.7.

9. A composite article as recited in claim 1, wherein the volume fraction of said fibers is at least about 0.75.

10. An article as recited in claim 1, wherein said elastomeric matrix material comprises an elastomer having a glass transition temperature of less than about 0° C.

11. An article as recited in claim 10, wherein said elastomer has a glass transition temperature of less than about −40° C.

12. An article as recited in claim 10, wherein said elastomer has a glass transition temperature of less than about −50° C.

13. An article as recited in claim 1, wherein said elastomeric matrix material has tensile modulus of less than about 5,000 psi.

14. An article as recited in claim 1, wherein said elastomeric matrix material has a tensile modulus of less than about 1,000 psi.

15. An article as recited in claim 1, wherein said elastomeric matrix material has a tensile modulus of less than about 500 psi.

16. An article as recited in claim 1, wherein said fibers have a tenacity of at least about 15 g/denier.

17. An article as recited in claim 1, wherein said fibers are polypropylene fibers having a tenacity of at least about 8 grams/denier.

18. An article as recited in claim 1, wherein said fibers are aramid fibers.

19. An article as recited in claim 1, wherein said fibers are polyvinyl alcohol fibers.

20. An article as recited in claim 1 comprising a plurality of networks each of said networks comprising a sheet-like array of said fibers in which said fibers are aligned substantially parallel to one another along a common fiber direction.

21. An article as recited in claim 20, wherein the fiber alignment directions in selected networks are rotated with respect to the alignment direction of another layer.

22. An article as recited in claim 1 wherein said fibers are coated with an elastomeric material having a modulus of less than about 6000 psi.

23. An article as recited in claim 20, wherein said networks are consolidated together with a binder composed of a non-elastomeric material.

24. An article as recited in claim 22, wherein said coated fibers are in the form of yarn and a plurality of the yarns are arranged to form the network.

25. An article as recited in claim 1, wherein said network of fibers is comprised of dissimilar fibers having different compositions.

26. An article as recited in claim 1, wherein said elastomeric material consists essentially of a polystyrene-polyisoprene-polystyrene, tri-block copolymer.

27. An article as recited in claim 1, wherein said elastomeric material consists essentially of a polystyrene-polyethylene/butylene-polystyrene tri-block copolymer.

28. An article as recited in claim 1, wherein said elastomeric material consists essentially of a crosslinked polyisoprene.

29. An article as recited in claim 1, wherein said fibers comprise polyethylene strips.

30. An article as recited in claim 29, wherein said strips are woven to form said network.

* * * * *